June 13, 1967 R. H. JENKINS 3,325,794

SKEW CORRECTION SYSTEM

Filed Jan. 3, 1961

3 Sheets-Sheet 1

INVENTOR.
Robert H. Jenkins
BY
Morris A. Rabkin
ATTORNEY

SKEW CORRECTION SYSTEM

Filed Jan. 3, 1961 3 Sheets-Sheet 2

INVENTOR.
Robert H. Jenkins
BY
ATTORNEY

INVENTOR.
Robert H. Jenkins
BY
ATTORNEY

United States Patent Office 3,325,794
Patented June 13, 1967

3,325,794
SKEW CORRECTION SYSTEM

Robert H. Jenkins, Audubon, N.J., assignor to Radio Corporation of America, a corporation of Delaware
Filed Jan. 3, 1961, Ser. No. 80,208
10 Claims. (Cl. 340—174.1)

The present invention relates to recording and reproducing systems, and more particularly to systems for recording and reproducing the bits of multi-bit characters of digital information which are recorded across the width of a magnetic tape record.

The invention is especially suitable for use in conjunction with digital computer systems for storing, on a magnetic tape record, data which are derived from or which are to be supplied to the computers. Features of the invention are also useful generally in digital and other information handling systems.

It is desirable to increase the capacity of systems in which digital information is stored on a magnetic tape by providing very close packing density of the characters which are recorded on the tape. Packing density is, however, limited by skew, or the angular change in the positional relationship of the tape to the head which records and reproduces the characters of digital information. Since the bits constituting a character of digital information are recorded across the width of the tape, the head near one edge of the tape may, because of skew, be reproducing or reading a bit belonging to one character while the head near the opposite edge of the tape is reading a bit belonging to another character. Accordingly, it is necessary to allow sufficient time between the recording of successive characters to accommodate for skew. By reducing to a minimum the time which must be allotted between successive characters because of skew, the character packing density on the tape can be increased. It follows that skew alters the time relationship which exists among the bits when they are recorded on the tape. Thus, the time relationship among the bits, when reproduced, may be entirely different from that which existed when the bits were recorded. The time displacement between reproduction of the first bit and the last bit of a multi-bit character which is caused by skew is referred to herein as the "skew period."

Deskewing systems have been provided for realigning the bits of a character after reproduction in a manner which compensates for skew. Such deskewing systems are known to include a register for storing the bits reproduced from each record track on the tape for a sufficiently long period of time to allow for all of the bits of a character to enter and to be stored simultaneously in different stages of the register. Since the bits belonging to a next successive character on the tape might be entered erroneously in the register as a bit of the preceding character, the characters are recorded separately from each other. The character separation is such that a bit of a succeeding character can not occur within the period allowed for storage of the bits of a preceding character. Time must also be allowed so that a clock pulse which synchronizes the system will occur and condition the register to read out the preceding character. This time allowance is called a staticizing delay and is additional to the delay which is needed to compensate for skew.

Although the aforementioned systems compensate for skew, it limits the character packing density on the record tape. Higher character packing densities are desirable, since the capacity of the tape record to store information depends upon the character packing density. Several other types of deskewing systems have been suggested. However, these allow either relatively low character packing density for their proper operation or are very complex and expensive.

It is an object of the present invention to provide an improved system for recording and reproducing, on a tape record, a character represented by a plurality of bits, by means of which very high character packing density on the tape record is obtainable.

It is a further object of the present invention to provide an improved system for compensating for the effects of skew in multi-bit storage systems utilizing tape records.

It is a still further object of the present invention to provide a system for compensating for skew and other timing variations due to mechanical and electrical factors, which system will result in very high information storage capacity on a tape record.

It is a still further object of the present invention to provide an improved system for compensating for skew which permits the attainment of very high character packing density on a record tape and which, nevertheless, is less complex, more reliable and less expensive than known systems for obtaining comparable packing density.

Briefly described, a system in accordance with the invention includes apparatus for recording a pair of timing bits simultaneously with the data bits of each character of information which is recorded on a tape record. The timing bits are separately recorded on timing tracks adjacent the opposite edges of the tape record. Storage devices capable of storing a single bit are provided for each track on the tape record.

Because of their geometrical relationship on the tape, timing bit signals from both timing tracks will be present simultaneously only after the end of the skew period for a character. Means may be provided responsive to the reading of both of the timing bits associated with a character for reading out the data bits of the character simultaneously after a delay to accommodate other timing errors resulting from other electrical and mechanical devices in the recording and reproducing system. Thus, the data bits are read out from their storage devices under the control of the timing bits which are read from the timing tracks.

Since the skew period is precisely determined by the system of the present invention, successive characters may be recorded on the tape record with a separation only slightly greater than the separation dictated by the skew period. Thus, high character packing density may be obtained.

In accordance with another feature of the invention, an improved circuit is provided for coupling the record-reproduce heads (hereinafter call the "write-read" heads) to their associated circuits. These circuits apply the signals representing bits to the head for recording on the tape and are operative for deriving the recorded signals from the tape.

Briefly described, one of these coupling circuits may include a Zener diode connected across the input of the reading circuit, or the circuit which reads the signal picked up by the write-read head. The Zener diode has a well defined voltage breakdown characteristic in the reverse direction, which is the direction opposite to the direction of easy current flow through the Zener diode. Accordingly, relatively high impedance will be provided across the input to the reading circuit over a discrete signal amplitude range. Signal amplitudes exceeding this range will cause Zener breakdown in the diode and provide a low impedance across the reading circuit to the end that the high amplitude signals will be shunted away from the reading amplifier circuit through the Zener diode. The Zener diode, therefore, provides a highly precise, signal amplitude sensitive switch when used in a write-read head coupling circuit.

The invention itself, both as to its organization and method of operation, as well as additional objects and advantages thereof, will become more readily apparent from a reading of the following description in connection with accompanying drawings in which.

Figure 3:
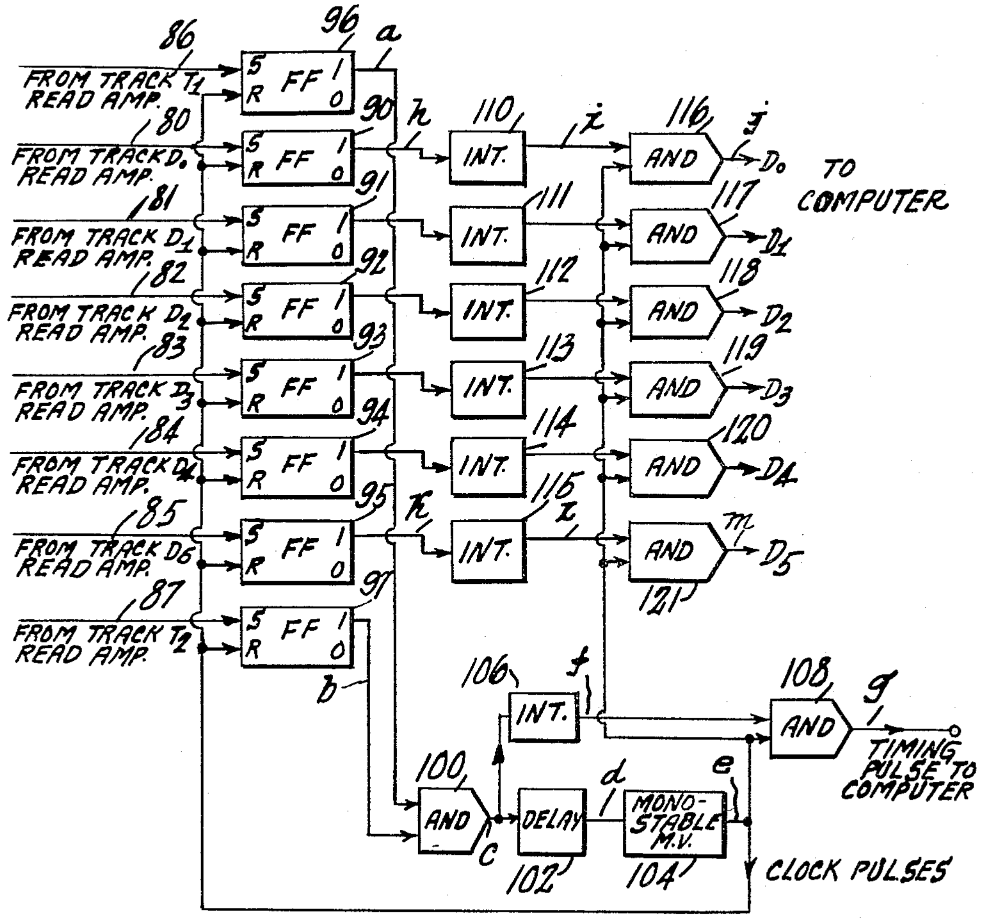
FIGURE 3 is a block diagram showing another portion of a system in accordance with the present invention for writing and reading a multi-bit character on a tape record, which portion operates to compensate for skew.
Figure 4:
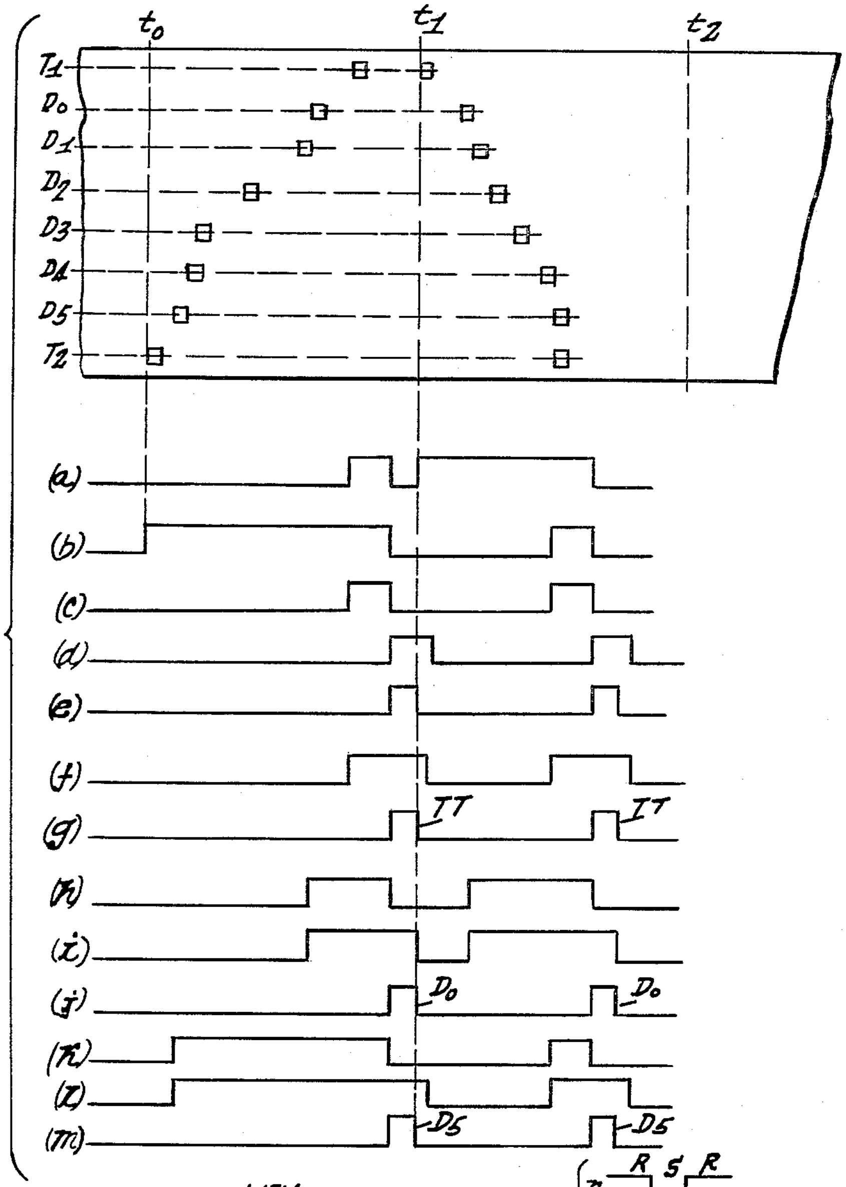
Figure 5:
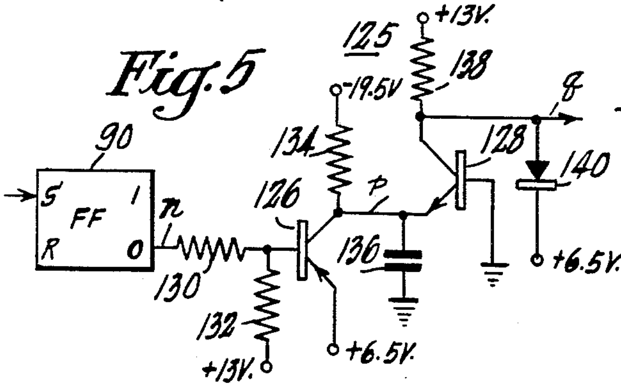

FIGURE 4 is a timing chart, including a showing of a segment of a tape record, which diagrammatically depicts the positions on the record of recorded bits of a pair of successively recorded characters, the chart illustrating the sequence of operations of the skew compensating system illustrated in FIG. 3; and FIGURES 5 and *5a* are, respectively, a schematic diagram and timing chart which illustrate an integrating circuit in accordance with a feature of the invention and depicts its operation.

Figure 1:
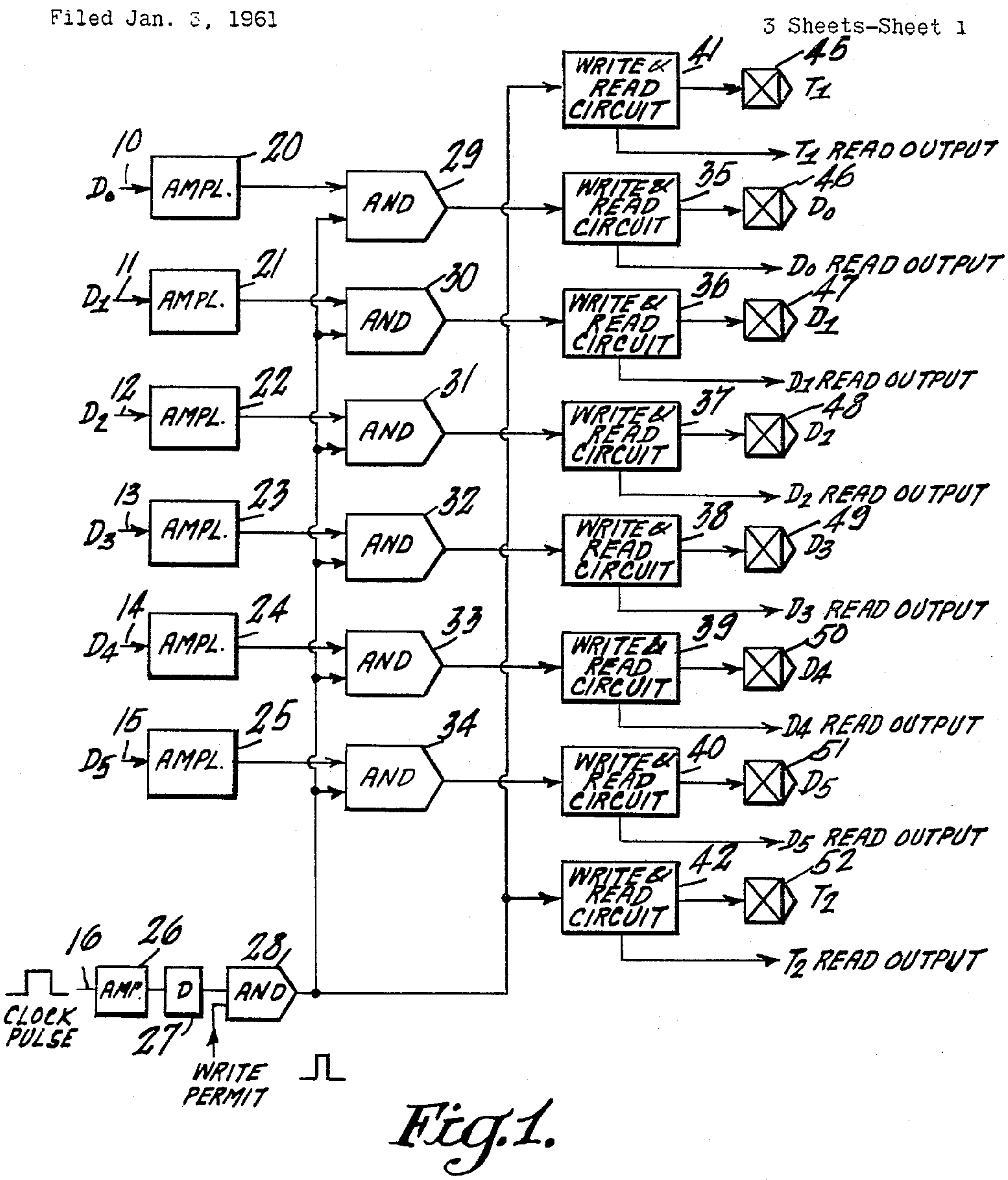
FIGURE 1 is a block diagram of a portion of a system in accordance with the present invention for writing and reading multi-bit characters on a tape record.

Referring, more particularly, to FIG. 1 of the drawings, there is shown a plurality of signal input lines 10 to 15 which may originate in a computer or other computer input or output device and which carry data bits $D_0$, $D_1$, $D_2$, $D_3$, $D_4$ and $D_5$. The data bits $D_0$ to $D_5$ constitute a character of digital information which is to be written on a tape record (not shown in FIG. 1). The bits are represented by appropriate signals which may be of predetermined voltage level appearing on the lines 10 to 15. Line amplifiers 20 to 25 are connected to lines 10 to 15, respectively. The bits $D_0$ to $D_5$ are amplified and equalized in the amplifiers 20 to 25. Such amplification is usually required since the equipment in which bits may originate may be at a distance and the lines 10 to 15 may be quite long. The amplified bits are fed, respectively, into inputs of AND gates 29 to 34.

Clock or timing pulses which may be generated by a local oscillator or in the computer or other device associated with the system illustrated in the drawings are carried by a line 16 and amplified in a line amplifier 26. The amplified pulses are delayed in a delay network 27 and applied to an AND gate 28. The output of this AND gate 28 primes the AND gates 29 to 34 upon simultaneous occurrence of a timing pulse and a "write permit" signal of appropriate level which is applied to another input of the AND gate 28. The AND gates 29 to 34 gate the output of the data bit line amplifiers 20 to 25, respectively.

The outputs of the AND gates 29 to 34 are connected to the write inputs of write and read circuits 35 to 40, respectively. The output of the AND gate 28 is connected to write and read circuits 41, 42, which are similar to the circuits 35 to 40. These write and read circuits will be described in connection with FIG. 2 of the drawings. The write and read circuits 41, 35 to 40 and 42 are connected to magnetic write-read heads 45 to 52, respectively. These heads may be mounted as a unitary structure to provide a multi-track magnetic head. The signal gaps of all of the heads may be in line. The heads are adapted to scan a relatively wide (¾ inch) magnetic tape record. A line extending through the gaps, or gap line, is disposed across the width of the tape. This gap line is desirably perpendicular to the edges of the tape. Each of the heads 45 to 52 will record a separate record track which extends longitudinally on the tape. The record tracks which are disposed adjacent the edges of the tape are referred to herein as timing tracks. The six (6) tracks which are disposed between the timing tracks are each adapted to carry different ones of the separate data bits $D_0$ to $D_5$.

The system illustrated in FIG. 1 operates to record a character of digital information on the tape record as follows: The AND gate 28 is primed by the write permit signal of appropriate level. The clock pulse is then gated through the AND gate 28, after a delay in the delay circuit 27 to accommodate different delays in the lines and amplifiers 20 to 25, and primes the AND gates 29 to 34. The bits $D_0$ to $D_5$ appear on the lines 10 to 15 simultaneously with the clock pulses, as is normally the case. These bits $D_0$ to $D_5$ are transmitted through the primed AND gates 29 to 34 and are applied to the write and read circuits 35 to 40. The clock pulses are applied to the write and read circuits 41 and 42 at the same time as the bits $D_0$ to $D_5$ are applied to the write-read circuits 35 to 40.

The write and read circuits operate, as will be explained presently, to simultaneously apply recording current to the heads 45 and 52. Timing bits $T_1$ and $T_2$ are recorded in response to clock pulses on the end or timing tracks by the heads 45 to 52, respectively. Data bits $D_0$ to $D_5$ are recorded by the heads 46 to 51 simultaneously with the timing bits $T_1$ and $T_2$. Since the write and read circuits 35 to 42 are simultaneously energized, the heads 45 to 52 simultaneously record the bits of a character of digital information. Timing bits $T_1$ and $T_2$ accompany each character. The presence or absence of pulses in the tracks recorded by the heads 46 to 51 will depend upon the binary number represented by the character and the recording method which is used. Any known recording method may be suitable. However, a non-return to zero method is preferred.

Figure 2:
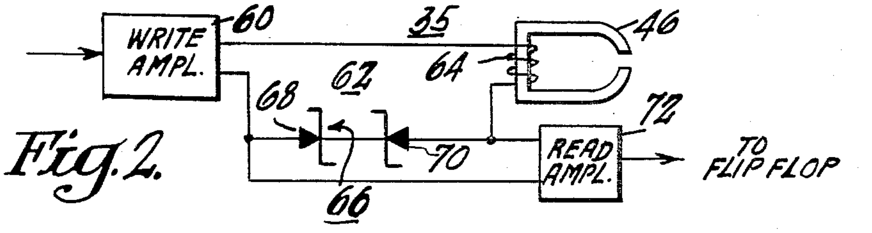
FIGURE 2 is a schematic diagram, partially in block form, showing one of the write and read circuits which are illustrated in FIG. 1.

One of the write and read circuits, namely, the circuit 35, which operates to write and read the bit $D_0$, is shown in FIG. 2. The other circuits 36 to 42 are identical. The circuit includes a write amplifier 60 to which the signal from the AND gate 29 is fed. This write amplifier 60 is connected by way of a coupling circuit 62 to the magnetic head 46. The amplifier 60 may include an output transformer the secondary of which may be connected, at one end thereof, to the coil 64 of the head 46 and, at the opposite end thereof, to a voltage sensitive switching circuit 66. The transformer is suitable when there is employed a modified non-return to zero recording method wherein the tape is saturated in one direction to represent a bit of one value and driven into saturation in the opposite direction to represent a bit of opposite value, as used in the RCA 501 computer tape station. This switching circuit includes two Zener diodes 68 and 70 which are connected back-to-back. The back-to-back relationship of the diodes 68 and 70 may be provided either by connecting the cathodes of these diodes to each other, as shown in FIGURE 2, or by connecting the anodes of the diodes to each other. A read amplifier 72 has its input connected across the switching circuit 66. The output of the read amplifier is connected to the "set" terminal of a flip-flop 90 in the reading channel for the record track scanned by the write-read head 46. This reading channel will be described presently.

The switching circuit operates to provide a low impedance shunt across the input of the reading amplifier 72 when the write amplifier is supplying writing current to the head 46. The switching circuit 66 also provides a relatively high impedance across the input of the read amplifier 72 when low amplifier currents flow through the Zener diodes 68 and 70, as is the case when the head 46 is reading signals previously recorded on the tape record.

Zener diodes 68 and 70 exhibit the Zener breakdown effect. In accordance with this effect, when a voltage of greater than a predetermined magnitude (termed the Zener breakdown voltage) is applied across a Zener diode and tends to bias the diode in the reverse direction (i.e., direction opposite to the direction of easy current flow therethrough), the resistance presented to current flow in the reverse direction drops to a negligible value. When the write amplifier is operated to drive the head 46, a voltage appears across the input of the read amplifier 72 and is applied in the reverse direction across one of the Zener diodes 68 and 70 which is sufficiently great to cause Zener breakdown in that one diode. The voltage across the other Zener diode is in the forward direction. Thus, the other Zener diode operates like a conventional diode when biased in the forward direction and exhibits substantially negligible resistance to current flow therethrough in the forward direction. The impedance and voltage across the read amplifier input will therefore be negligible during writing and the read amplifier 72 will be effectively shunted out of the coupling circuit.

When signals are being picked up or read by the head 46 and the write amplifier is not producing recording current, a low amplitude signal of a voltage magnitude insufficient to cause Zener breakdown of either one of the diodes 68 or 70 is developed across the input of the read amplifier 72. It is immaterial that the other Zener diode is biased, as is the case during write amplifier operation, to provide substantially negligible impedance, since, during reading, one of the two Zener diodes 68 and 70 is biased in the reverse direction, but by a voltage insufficient to cause Zener breakdown. Accordingly, the impedance across the read amplifier input is substantially constant at all times during reading, regardless of the polarity of the voltage across the Zener diodes 68 and 70.

An important advantage arising from the use of Zener diodes 68 and 70 is that the voltage amplitude at which the switching device impedance changes from a low impedance to a high impedance can be accurately determined by selecting a Zener diode having the desired Zener breakdown voltage. Conventional diodes have been used across the input of read amplifiers in known circuits for coupling write and read amplifiers to write-read heads. In a known circuit, a pair of conventional diodes are connected in parallel across the input of the read amplifier and polarized appropriately with respect to each other. Larger amplitude signals can be applied to the read amplifier when Zener diodes are used, as described herein, than would be the case, if conventional diodes were used. This is because a higher voltage may be developed across a Zener diode before Zener breakdown occurs than can be developed across a conventional diode in the forward direction before the resistance of the diode to current flow in the forward direction becomes negligible.

The switching device 66 may include a single Zener diode instead of a pair of back-to-back Zener diodes. However, the voltage appearing across the read amplifier input will not be constant for current flow in both directions across the read amplifier input. The use of the back-to-back connected Zener diodes is therefore preferable. Zener diodes which are suitable for use in the switching device 66 may be type 1N465.

As mentioned above, the write-read head is adjusted so that the gap line of the heads 45 to 52 is perpendicular to the edges of the tape. Due to tolerances in the manufacture of the head, the gaps are not all exactly aligned along the gap line. The displacement of the various heads 46 to 52 from the gap line is known in the art as "gap scatter." Misalignment of the gap line from a perpendicular to the edges of the tape is referred to as "azimuth error."

Referring to FIG. 3, there is shown a system for compensating for skew in the recording and reproducing process. Lines 80 to 87 connect the read amplifiers in the write and read circuits 35 to 42 to flip-flops 90 to 97, respectively. These flip-flops are of the set-reset type known in the art and have "1" and "0" outputs. The "1" outputs become energized when the flip-flops are set, and the "0" outputs become energized when the flip-flops are reset. The flip-flops 90 to 97 each provide storage for a single bit or pulse which is read from the tape record. The flip-flops are set upon occurrence of a pulse or bit and may be reset by a clock pulse which is generated internally in the system of FIG. 3 in a manner which will be described presently herein.

The flip-flops 90 and 97 provide storage for only a single bit and are much simpler and of lower cost than registers used in deskewing systems of the prior art which permit the attainment of character packing densities comparable with the densities obtainable through use of this invention. Such prior art systems often use shift registers which are many times more complex and costly than the flip-flops or other single bit storage means which may be used in accordance with the present invention.

The flip-flops 90 to 95 from parts of reading channels for the record tracks in which the data bits $D_0$ to $D_5$ are recorded. The flip-flops 96 and 97 form parts of reading channels for the tracks in which the timing bits $T_1$ and $T_2$ are recorded. Circuit means including the flip-flops 96 and 97 are provided for measuring the skew period of each character of digital information. Since the timing bits are recorded adjacent the opposite edges of the tape record, the displacement of the recorded timing bits $T_1$ and $T_2$ relative to each other due to skew will be greater than the displacement of any other pair of bits included in the same character. Timing bits $T_1$ and $T_2$ will also be displaced by the skew period for the character. The simultaneous storage of the timing pulse in the flip-flop 96 and 97 will take place after termination of the skew period. An AND gate 100 connected to the outputs of the flip-flops 96 and 97 provides an output signal when the flip-flops 96 and 97 are both set. An output from the AND gate 100 thus indicates the end of the skew period for the character which includes the timing bits $T_1$ and $T_2$. The output of the AND gate is delayed in a delay circuit 102. This delay circuit provides a delay additional to the skew period to accommodate timing errors such as are caused by gap scatter, variations in tape velocity, and variations in time of operation of electrical circuits, such as the flip-flops 90 to 97 and other circuits to be described presently. The delay circuit 102 may be a delay line or other delay element of the type which is known in the art. The output of the delay circuit 102 triggers a monostable multivibrator 104 which provides an output clock pulse of predetermined duration. This clock pulse is used to control read-out of the bits belonging to the same character.

The output of the AND gate 100 is applied to an integrating circuit 106. This integrating circuit may be a diode resistance-capacitance charging circuit similiar to circuits of known design which are often used as fast recovering integrating circuits. The diode of the charging circuit permits the capacitor to change quickly through a low resistance and prevents rapid discharge by effectively decoupling the low resistance from the capacitor. This integrating circuit 106 effectively stretches the width of the output pulse from the AND gate 100 and functions to maintain a voltage at the circuit output approximately equal to the output voltage from the AND gate 100 for a predetermined time (e.g., 1.5 microseconds) after the gate 100 ceases to provide an output. Since the integrating circuit 106 desirably has a fast charging time, its output rises almost simultaneously with the AND gate 100 output so that integration takes place only at the end of the output pulse from the AND gate 100. Another circuit shown in FIG. 5 may be used as an integrating circuit and will be described below.

The integrating circuit 106 is connected to another AND gate 108. The clock pulse from the monostable multivibrator 104 is connected to the AND gate 108 and enables the gate to provide a timing pulse for use in the computer or other device to which the data bits are supplied. These timing pulses are employed within the using device to indicate the receipt of a character. Thus, it is possible to utilize a character in which all data bits are "zeroes," or recognize that the data bits are not present when they should be.

The "1" outputs of the flip-flops 90 to 95 in the reading channels for the data bit tracks are connected through integrating circuits 110 to 115 to inputs of AND gates 116 to 121, respectively. The integrating circuits 110 to 115 may be similiar to the integrating circuit 106 and serve to maintain the level at the output of the flip-flops for a predetermined time (e.g., 1.5 microseconds) after the flip-flops are reset. The integrating circuits shown in FIG. 5 have been found especially suitable.

Referring to FIG. 5, an integrating circuit 125 is shown which may be used instead of the integrating circuits 106 and 110 to 115 (FIG. 3). This integrating circuit 125 is connected to one of the flip-flops in a reading channel of the system shown in FIG. 3, the flip-flop 90 being taken for the purpose of illustration. It will be noted that the "0" output of the flip-flop 90 is connected to the input of the integrating circuit 125, whereas, in the system shown in FIG. 3, the "1" output of the flip-flop 90 is connected to the input of the integrating circuit 110. The integrating circuit 125 responds to negative going pulses, whereas the integrating circuit 110 (FIG. 3) responds to positive going pulses. As will be explained presently, the output *q* of the integrating circuit 125 is a positive going pulse similar to the output pulse from the integrating circuit 110. In the event that an integrating circuit similar to the integrating circuit 125 is used, instead of the integrating circuit 106, at the output of the AND gate 100, an inverter of complementing circuit of known design should be connected between the output of the AND gate 100 and the input of the integrating circuit 125, so that the integrating circuit 125 will respond to the output pulse of the AND gate 100.

The integrating circuit 125 includes a pair of transistors 126 and 128 of opposite conductivity type. The transistor 126 is a PNP transistor where as the transistor 128 is a NPN transistor. The "0" output *n* of the flip-flop 90 is at a level of +6.5 volts when the flip-flop is reset and provides a pulse of 0 volts, or ground potential, when the flip-flop is set. The magnitude of the voltages are mentioned herein solely for purposes of facilitating the description of the circuit. Other voltages may be chosen depending upon the transistor types and the voltage levels present in the computer system involved.

The base of the transistor 126 is connected to a voltage divider including a pair of resistors 130 and 132. One end of the resistor 132 is maintained at +13 volts by a source of operating potential (not shown). The emitter of the transistor 126 is maintained at +6.5 volts by the source of operating voltage. The collector of the transistor 126 is connected to another source of operating voltage of −19.5 volts through a collector resistor 134. A capacitor 136 is connected in the emitter to collector path of the transistor 126. This capacitor 136 is also common to the base to emitter path of the NPN transistor 128. The collector of the NPN transistor 128 is connected to a source of operating voltage of +13 volts through a collector resistor 138. The output *q* of the circuit 125 is obtained between the collector of the transistor 128 and ground. This output voltage is clamped to a voltage of +6.5 volts by a diode 140.

Figure 5A:
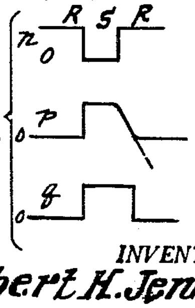

The timing chart (FIG. 5*a*) shows that the input voltage *n* is a pulse of "0" volts when the flip-flop 90 is set. The voltage at the base of the transistor 126 then becomes negative with respect to the voltage at the emitter of the transistor 126 due to the voltage drop in the resistors 130 and 132. The transistor 126 then becomes conductive. Charging current then flows through the emitter to collector path of the transistor 126 into the capacitor 136 and rapidly charges the voltage *p* across the capacitor. Since the capacitor 136 is clamped to ground by the emitter to base portion of the transistor 128, the voltage *p* across the capacitor 136 rises from ground potential when the transistor 126 becomes conductive (i.e., when the flip-flop 90 is reset). The voltage across the capacitor 136 rises rapidly to about 6.5 volts, which is the voltage at which the emitter of the transistor 126 is maintained.

As soon as the capacitor 136 charges to a positive voltage, conduction through the NPN transistor 128 is cut off. The output *q* at the collector of the transistor 138 then rises to +6.5 volts, which is the clamping level set by the diode 140 and its source of operating voltage.

When the flip-flop 90 is reset, conduction in the emitter to collector path of the transistor 126 is cut off. The capacitor 136 then begins to discharge to a voltage of −19.5 volts through the collector resistor 134. The rate of discharge is determined by the time constant of the circuit including the capacitor 136 and resistor 134. When the capacitor 136 discharges to a point where the voltage thereacross reaches approximately ground potential, the transistor 128 becomes conductive. The output voltage *q* then returns to ground potential. It will be noted that the output voltage *q* returns to ground potential a short time after flip-flop 90 is reset. Thus, the output pulse from the flip-flop 90 is effectively stretched; that is, its duration is extended. A duration extension of approximately 1.5-microseconds is suitable in the system of FIG. 3. The amount of pulse stretching can be controlled by varying the values of the resistor 134 and the capacitor 136 and the magnitude of the operating voltage which is applied to the collector resistor 134.

During the skew period, the data bits are read from the tape asynchronously and are stored asynchronously in the flip-flops 90 to 95. Assuming, for the purpose of illustration, that a bit is recorded on the tape to represent a binary "one" and the absence of a bit is representative of a binary "zero," when a binary "one" bit is read from the tape, a flip-flop in the reading channel which reads this binary "one" bit is set. The output of this flip-flop is integrated and primes the AND gate in its reading channel. At the end of the skew period, as indicated by the simultaneous storage of the timing bits $T_1$ and $T_2$ in the flip-flops 96 and 97 and after a suitable delay in the delay circuit 102 to accommodate gap scatter and the other timing errors mentioned above, the AND gates 116 to 121 are enabled and simultaneously read out the bits which are stored in the flip-flops 90 to 95. Since the bits are read out simultaneously, they have the same time relationship as existed upon recording. Accordingly, any skew and other timing errors incident to the record and reproducing process is compensated.

The timing relationship among the signals in various parts of the deskewing system shown in FIG. 3 and the positional relationships of the bits and pulses recorded on the tracks on the tape record are shown in FIG. 4. The curves *a* to *m* are waveforms of signals which appear at correspopnding points *a* to *m* in the system of FIG. 3.

A portion of a tape record 124 in which the bits of the characters are recorded on record tracks, identified in FIG. 4 as $T_1$, $T_2$ and $D_0$ to $D_5$, are shown. It is assumed that the gap line of the write-read head is intended to be perpendicular to the edges of the tape. Because of skew, the bits are displaced with respect to the gap line of the head as shown in FIG. 4 of the drawings.

One character is recorded between the times $t_0$ and $t_1$. The second or next successive character is recorded between the times $t_1$ and $t_2$. It will be noted that the bits are shown skewed in one sense or direction in the first character and in the opposite direction in the second character. The opposite sense of skew in successive characters is merely for the purpose of illustration of the mode of operation of the system. Ordinarily, the skew changes little in successive characters. The flip-flop 97 is set first since the bit $T_2$ is read from the tape at time $t_0$. The other flip-flops 90 to 95 in the reading channels for the data bits $D_0$ to $D_5$ are set asynchronously. Only the operation of the reading channels for the tracks which read the bits $D_0$ and $D_5$ are shown in the drawings. The operation of the reading channels for each of the other data bits is similar and will be apparent from the discussion of the operation of the reading channels for the data bits $D_0$ and $D_5$. Since the data bit $D_5$ is read before the data bits $D_0$, the flip-flop 95 will be set before the flip-flop 90.

As is apparent from waveforms *b*, *k*, and *h*, the flip-flops 97, 95 and 90, respectively, provide outputs in sequence when they are set in response to bits $T_2$, $D_5$ and $D_0$. At the end of the skew period, the timing bit $T_1$, which is also contained in the first character, is read from the tape and sets the flip-flop 96. When both flip-flops 96 and 97 are set, the AND gate 100 provides an output, as is indicated in waveform *c*. The leading edge of the output from the AND gate 100 is delayed at the output of the delay circuit 102, as indicated in waveform *d*. The leading edge of the delayed output triggers the multivibrator 104 and a clock pulse, shown in waveform *e*, is produced by the multivibrator 104. The outputs of the AND gates 100 and the outputs of the flip-flops 90 to 95 pass through the integrating circuits 106 and 110 to 115. The voltages at the outputs of the integrating circuits 106, 110 and 115 are shown in waveforms *f, i,* and *l*. The clock pulse resets the flip-flops so that the flip-flop outputs terminate a short time after the clock pulse appears. However, the flip-flop outputs and the AND circuit output 100 are maintained at the outputs of the integrating circuit 106, 110 and 115 (waveforms *f, i,* and *l*, respectively). The AND gates 116 to 121 are enabled by the clock pulse at the same time that the flip-flops 90 to 97 are reset. The integrating circuits insure that the outputs of the flip-flops will be maintained at the inputs to the AND gates 116 to 121 even though the flip-flops 90 to 97 are reset before the AND gates 116 to 121 are operative to provide their respective outputs. Thus, the flip-flops 90 to 97 may be reset and the data bits may be read out to the computer or other equipment simultaneously, rather than sequentially. This results in an increase in the speed of operation of the system. The flip-flops are capable of storing the bits of the second character immediately after they are reset.

The second character is recorded almost immediately after the skew period of the first character. In any case, sufficient time and space on the tape is allotted between the characters to accommodate the worst condition of skew. However, very little more space need be allowed than is required for the worst skew condition, since even the worst skew condition is measured accurately and compensated by the system provided by the present invention.

From the foregoing description, it will be apparent there has been provided an improved system for recording and reproducing signals on a plurality of record tracks on a tape record. While only one embodiment of this system has been discussed herein, it will be apparent that variations in the system, as well as in component circuits thereof, within the scope of the invention, will undoubtedly suggest themselves to those skilled in the art. Accordingly, the foregoing should be taken as illustrative and not in any limiting sense.

What is claimed is:

1. In apparatus for reading the bits of a multi-bit character which are recorded on separate tracks across a tape record, a skew compensating system which comprises a plurality of flip-flops, one flip-flop corresponding to a different one of said tracks, means for reading the bits from each of said tracks and storing said bits in the flip-flops corresponding to the respective ones of said tracks, and means responsive to the simultaneous presence of bits stored in the flip-flops corresponding to a pair of said tracks which are disposed adjacent the opposite edges of said record for resetting all of said flip-flops and reading out the bits stored therein.

2. In a system for reading the bits of a multi-bit character which are recorded in separate record tracks on a tape record, means responsive to bits read from said tape for measuring the skew period of said character, means for providing only an individual bit capacity storage device for each channel, each said storage device receiving and storing an individual bit of said character only during said skew period for all skew conditions, and means for simultaneously reading out all the bits stored in said storage device at the end of said skew period.

3. In a system for reading the bits of a multi-bit character which are separately recorded across a tape record, and combination of a plurality of reading channels each individually to a different one of said bits, a plurality of flip-flops each separately included in a different one of said reading channels, means for reading the bits of said characted into said flip-flops, integrating circuits for maintaining the outputs of said flip-flops for an interval after said flip-flops are reset, means including said read channels for two of said bits each of which is recorded adjacent a different opposite edge of said tape record for measuring the skew period of said character, and means under the control of said skew period measuring means for reading the outputs of said integrating circuits and simultaneously resetting said flip-flops whereby to obtain said bits from said channels.

4. In a system for recording and reproducing signals which are recorded on a plurality of record tracks of a magnetic tape record, a skew compensating system which comprises means responsive to signals reproduced from said tape for measuring the skew period of a group of signals each recorded on a different one of said tracks, a plurality of single stage storage devices each for providing an output signal when set and each of which is adapted to be reset, means for reproducing said tracks and storing signals from different ones of said tracks separately in different ones of said devices, a plurality of means respectively responsive to output signals from different ones of said plurality of storage devices for storing said output signals for a predetermined time after termination thereof, means for gating the signals stored in said output signal storing means, and means controlled by said skew period measuring means for simultaneously enabling said gating means to read out said output signals and resetting said storage devices at the end of the skew period.

5. In a system for reading data which are written on a plurality of record tracks of a magnetic tape record, a skew compensating system which comprises means responsive to signals reproduced from said tape for measuring the skew period of a group of signals corresponding to said data, said signals each being recorded on a different one of said tracks, a plurality of flip-flops having set and reset inputs and providing signal outputs when set, means for reading said tracks and for setting said flip-flops to store signals from different ones of said tracks in different ones of said flip-flops, a plurality of integrating circuits separately responsive to the signal outputs from different ones of said flip-flops, a plurality of AND gates, means for applying the outputs of different ones of said integrating circuits to the inputs of different ones of said gates, means controlled by said skew period measuring means for generating clock pulses at the end of each skew period, and means for connecting said clock pulse generating means to said reset inputs and to inputs of each of said gates whereby to simultoneously reset said flip-flops and enable said gates at the end of each skew period.

6. In a system for reading the bits of a multi-bit character which are recorded on separate record tracks across the width of a tape record, a deskewing system comprising a plurality of flip-flops each for storing the bits read from a different one of said tracks and each providing an output pulse when set, a plurality of circuits individual to said different ones of said flip-flops for maintaining said flip-flop output pulses for an interval after said flip-flops are reset, said circuits including first and second transistors of opposite conductivity type, each of said transistors having a collector, a base and an emitter, a capacitor common to the emitter-to-collector path of said first transistor and the base-to-emitter path of said second transistor, means for applying said flip-flop output pulses to said first transistor whereby said capacitor charges almost instantly upon occurrence of one of said flip-flop pulses, and means for deriving a circuit output pulse in response to current flowing in the emitter-to-collector path of said second transistor, and means responsive to the simultaneous presence of a bit recorded in each of a pair of said record tracks for simultaneously reading out said circuit output pulses and resetting said flip-flops.

7. Means for deskewing bytes of data bits received from a plurality of channels, comprising means for registering data bits provided by each byte, and bit-presence detecting means associated with said register and at least a pair of said channels at boundary skew positions, single AND gate means receiving outputs of said bit-presence detecting means, and means for sampling the output of said registering means in response to an output of said AND gate means.

8. Means for deskewing bytes of data bits as defined in claim 7 in which said bit-presence detecting means is provided for opposite channels read from tape.

9. Means for deskewing bytes of data bits as defined in claim 7 in which said bit-presence detecting means is provided at least for channels expected to receive bits that are skewed farthest apart in any received byte.

10. Means for deskewing bytes of data bits as defined in claim 7 including a delay means providing a relatively short delay in comparison to a byte period, said delay means being connected between the output of said AND gate means and reset inputs of said bit-presence detecting means.

References Cited

UNITED STATES PATENTS

| | | | |
|---|---|---|---|
| 2,122,748 | 7/1938 | Mayer | 323—66 |
| 2,817,829 | 12/1957 | Lubkin | 340—174.1 |
| 2,860,260 | 11/1958 | Sykes | 307—88.5-16 |
| 2,885,573 | 5/1959 | Clapper | 307—88.5 |
| 2,907,989 | 10/1959 | Guerber | 340—174.1 |
| 2,922,144 | 1/1960 | White et al. | 340—174.1 |
| 2,937,239 | 5/1960 | Garber | 340—174.1 |
| 2,937,366 | 5/1960 | Sims | 340—174.1 |
| 2,948,884 | 8/1960 | Guerber et al. | 340—174.1 |
| 2,955,200 | 10/1960 | Scott | 328—206 |
| 2,969,528 | 1/1961 | Chen | 340—174.1 |
| 2,981,893 | 4/1961 | Agalides et al. | 328—206 |
| 2,984,780 | 5/1961 | Koletsky | 323—66 |
| 3,064,242 | 11/1962 | Hill et al. | 340—174.1 |
| 3,076,183 | 1/1963 | Willoughby | 340—174.1 |

FOREIGN PATENTS

| | | |
|---|---|---|
| 809,849 | 3/1959 | Great Britain. |

BERNARD KONICK, *Primary Examiner.*

STEPHEN W. CAPELLI, IRVING L. SRAGOW, *Examiners.*

K. E. JACOBS, R. J. McCLOSKEY, T. W. FEARS, *Assistant Examiners.*